(12) United States Patent
Mijuskovic et al.

(10) Patent No.: US 7,684,518 B2
(45) Date of Patent: Mar. 23, 2010

(54) LOGIC THRESHOLD ACQUISITION CIRCUITS AND METHODS USING REVERSED PEAK DETECTORS

(75) Inventors: Dejan Mijuskovic, Chandler, AZ (US); Frederick H. James, Phoenix, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 775 days.

(21) Appl. No.: 11/118,230

(22) Filed: Apr. 28, 2005

(65) Prior Publication Data
US 2006/0245520 A1    Nov. 2, 2006

(51) Int. Cl.
*H04L 25/06* (2006.01)
(52) U.S. Cl. .................. 375/317; 375/316; 375/329
(58) Field of Classification Search .................. 375/317
See application file for complete search history.

(56) References Cited

U.S. PATENT DOCUMENTS

| | | | | |
|---|---|---|---|---|
| 5,021,747 | A * | 6/1991 | Isham et al. | 330/284 |
| 5,120,995 | A | 6/1992 | Abdi | |
| 5,955,918 | A * | 9/1999 | Uno | 330/9 |
| 6,051,998 | A * | 4/2000 | Lee et al. | 327/59 |
| 6,107,840 | A * | 8/2000 | Cameron et al. | 327/62 |
| 6,144,290 | A * | 11/2000 | Duval et al. | 324/520 |
| 6,151,150 | A * | 11/2000 | Kikuchi | 398/209 |
| 6,282,216 | B1 | 8/2001 | Ikeuchi et al. | |
| 6,359,941 | B1 * | 3/2002 | den Bakker | 375/317 |
| 6,381,270 | B1 * | 4/2002 | Lydon et al. | 375/230 |
| 6,674,328 | B2 * | 1/2004 | Uto et al. | 330/259 |
| 6,735,260 | B1 * | 5/2004 | Eliezer et al. | 375/316 |
| 6,927,630 | B2 * | 8/2005 | Dupuis et al. | 330/254 |
| 6,965,257 | B2 * | 11/2005 | Tanaka | 327/58 |
| 7,145,373 | B2 * | 12/2006 | Jaussi et al. | 327/158 |
| 2002/0041417 | A1 * | 4/2002 | Han et al. | 359/189 |
| 2002/0129380 | A1 * | 9/2002 | Orii | 725/136 |
| 2003/0092412 | A1 * | 5/2003 | Wu | 455/234.1 |
| 2003/0099307 | A1 * | 5/2003 | Wu | 375/317 |
| 2004/0041547 | A1 * | 3/2004 | Asano | 323/274 |

(Continued)

FOREIGN PATENT DOCUMENTS

JP    1995244091 A1    9/1995

OTHER PUBLICATIONS

International Search Report PCT/US06/07115 dated Sep. 24, 2007.

*Primary Examiner*—Shuwang Liu
*Assistant Examiner*—Kenneth Lam
(74) *Attorney, Agent, or Firm*—Ingrassia, Fisher & Lorenz, P.C.

(57) ABSTRACT

A circuit is provided which generates a first output signal and a second output signal. The circuit includes a reference signal input having a reference value, a first positioning circuit, and a second positioning circuit. The first positioning circuit generates the first output signal responsive to a first differential input signal and the reference signal, and the second positioning circuit generates the second output signal responsive to a second differential input signal and the reference signal. In one implementation, the positioning circuits may be reversed peak detectors. A minimum value of the first output signal and a minimum value of the second output signal are positioned along a common axis at values greater than or equal to the reference value.

13 Claims, 3 Drawing Sheets

U.S. PATENT DOCUMENTS

2004/0075484 A1* 4/2004 Nishizono et al. .......... 327/345
2004/0075499 A1 4/2004 Dupuis et al.
2004/0190914 A1* 9/2004 Kang et al. ................. 398/202
2005/0013355 A1* 1/2005 Smith et al. ................. 375/224
2006/0255860 A1* 11/2006 Moussavi ................... 330/278

* cited by examiner

LOGIC THRESHOLD ACQUISITION CIRCUITS AND METHODS USING REVERSED PEAK DETECTORS

TECHNICAL FIELD

The present invention generally relates to optical communications, and more particularly relates to techniques for acquiring a logic threshold.

BACKGROUND

Optical networks use light signals to transmit data over a network. Although light signals are used to carry data, the light signals are typically converted into electrical signals in order to extract and process the data. The conversion of a light signal into an electrical signal is often achieved utilizing an optical receiver. An optical receiver converts the light signal received over an optical fiber into an electrical signal, amplifies the electrical signal, and converts the electrical signal into a digital data stream.

Burst-mode Passive Optical Networks (BPON) are widely used in the cable industry for transmission of light signals from an optical transmitter at a home to an optical module located at the hub/curb. The optical module typically includes an optical receiver. Typical optical light signals used in BPON applications can have a frequency of a 155 Mbps or greater. The use of burst-mode techniques requires fast and accurate handling of the incoming signals and accurate handling of the optical power levels both on the transmitter and the optical receiver sides. The optical receiver receives an incoming light signal in the form of a burst of upstream traffic from each user in a group of users. Each user is typically located at a different point in a network. Each incoming burst is typically a fixed size such as 500 bits. Due to attenuation, the strength or amplitude of each incoming burst can vary significantly depending on the user's distance from the optical receiver, the length of the optical fiber the incoming burst travels over, the strength of the transmitter that sends the incoming burst, etc. For example, after conversion into voltage, an incoming burst from one user might have an amplitude of 1 V, whereas another incoming burst from another user might have an amplitude of 1 mV. Each incoming burst includes a 8-bit preamble (10101010). In BPON systems, the 155 Mbps burst mode optical receiver must acquire a logic threshold of the incoming burst during this 8-bit preamble such that it can discriminate between a logic 1 and a logic 0. The logic threshold is the value used to discriminate between a logic 1 and a logic 0. The logic threshold is determined for each incoming burst. The optical receiver module then uses this logic threshold to slice the incoming signal and produce digital output.

FIG. 1 is a block diagram of a conventional optical receiver module 50 which includes a transimpedance amplifier 25, a logic threshold acquisition circuit (LTAC) 40, and a comparator 45. The transimpedance amplifier 25 is coupled to the LTAC 40 and to the comparator 45, and the LTAC 40 is coupled to the comparator 45.

An incoming burst impinges on a photodiode coupled to the transimpedance amplifier 25. The transimpedance amplifier 25 amplifies an input current signal generated by the photodiode into a relatively large amplitude output voltage (Vo) signal. The transimpedance amplifier 25 communicates this output voltage (Vo) signal to the LTAC 40 which generates a logic threshold (LT). The LTAC 40 communicates the logic threshold (LT) to the comparator 45. The comparator 45 can then be used to compare the logic threshold (LT) to the output voltage (Vo) signal from the transimpedance amplifier 25 to determine if the incoming burst is a logic 1 or a logic 0. For example, if the incoming burst is greater than the logic threshold, the incoming burst is construed as a logic 1, and if the incoming burst is less than the logic threshold, the incoming burst is construed as a logic 0.

FIG. 2 is a circuit diagram of a conventional LTAC 40 used in the optical receiver module 50 of FIG. 1. The logic threshold acquisition circuit 40 has a top or positive peak detector (PPD) circuit 14, a bottom or negative peak detector circuit (NPD) 16 and a resistor string 18.

The PPD circuit 14 generates a positive output voltage (Vop) responsive to the input signal (Vin). The NPD circuit 16 generates a negative output voltage (Von) responsive to the input signal (Vin). Thus, the PPD circuit 14 measures a maximum peak value and the NPD circuit 16 measures a minimum peak value of the incoming burst.

A resistor string 18 can be coupled in series between the outputs of the PPD circuit 14 and the NPD circuit 16. The maximum peak value (Vop) of the incoming burst is received at one end of the resistor string 18 and the minimum peak value (Von) of the incoming burst is received at the other end of the resistor string 18. An average value can be taken from the middle of the resistor string 18. This allows the average value (or arithmetic mean) of the maximum peak value (Vop) of the incoming burst and the minimum peak value (Von) of the incoming burst to be explicitly determined. This average value is the logic threshold that is used to discriminate between a logic 1 and a logic 0. The incoming burst is compared to the logic threshold such that when the incoming burst exceeds the logic threshold, the optical receiver module 50 assumes it is receiving a logic 1, and when the incoming burst is below the threshold, the optical receiver module 50 assumes it is receiving a logic 0.

In some BPON applications, there is a desire to provide an optical receiver module 50 which is designed for high speed and low power. For instance, in one implementation, the power supply of the optical receiver module 50 is 3 volts. The conventional LTAC 40 described above can be inadequate in these applications due to a lack of power supply headroom. In addition, the LTAC 40 needs to acquire the logic threshold with high precision. For instance, in one implementation, the LTAC 40 needs to acquire the logic threshold with 1 mV of maximum error in detecting the logic threshold. Unfortunately, in such low power implementations, the positive output voltage (Vop) and the negative output voltage (Von) are offset from each other by an arbitrary amount and do not have a predefined relationship. It can be difficult to accurately determine where the positive output voltage (Vop) and the negative output voltage (Von) are positioned with respect to the reference voltage (Vref).

FIG. 3 is a circuit diagram of a conventional positive peak detector (PPD) circuit 14 used in the LTAC 40 of FIG. 2. The PPD circuit 14 employs a capacitor 2, a resistor 4, a diode 6, a resistor 7, a reset switch 8, a buffer 10, and an amplifier 12. The resistor 4 is coupled between the capacitor 2 and a first node B. The diode 6 is coupled between node B and node C, and the switch 8 is coupled between the node B and the resistor 7 to ground. The buffer 10 is coupled between the node B and a node A, and the amplifier 12 is coupled between the node A and the diode 6 at node C.

The capacitor 2 is grounded. The buffer 10 generates the positive output voltage (Vop). The amplifier 12 receives the first output voltage (Vop) and an input voltage (Vnin). The amplifier 12 is a high gain amplifier having a gain A which can be between 100 and 1000. The amplifier 12 drives node B which is coupled to the diode 6.

Initially, node B is at ground potential due to closed switch 8. Before a new logic threshold acquisition begins, the reset switch 8 can be opened to remove the reset and discharge node B and the capacitor 2 to ground potential. The input voltage (Vin) is then applied. The diode 6 turns on in response to a positive voltage when the input voltage (Vin) is larger than the positive output voltage (Vop). If the input voltage (Vin) is smaller than the voltage (V1) at node B, then nothing happens and the positive output voltage (Vop) remains the same. If the input voltage (Vin) is larger than the voltage (V1) at node B, then positive output voltage (Vop) tracks or assumes the value of the input voltage (Vin). For example, when the input voltage (Vin) is larger than the voltage (V1) at node B, the difference between the input voltage (Vin) and V1 will be amplified by an amount approximately equal to the gain of the amplifier 12 and the diode 6 turns on which begins charging node B to a higher potential. The positive output voltage (Vop) follows the voltage (V1) at node B and is input to the amplifier 12. If the input voltage (Vin) begins to decrease, then the amplifer 12 reacts such that the output of the amplifier 12 decreases rapidly in proportion to the gain of the amplifer 12. Eventually this can cause the diode 6 to shut off. The voltage (V1) at node B is then "stored" at node B via the capacitor and no longer depends on the input voltage the input voltage (Vin).

It should be appreciated that a bottom peak detector 16 can be constructed by simply flipping the diode 6 so that the anode and cathode are reversed. This way, the diode 6 would turn on in response to a negative voltage when a input voltage (Vin) is smaller than a negative output voltage (Von). If the input voltage (Vin) is smaller than the voltage V1 at node B, then the negative output voltage (Von) tracks or assumes the value of the input voltage (Vin). If the input voltage (Vin) is larger than the voltage V1 at node B, then nothing happens and negative output voltage (Von) remains the same.

The differential signals (Vop) and (Von) are typically separated or offset from one another by an unknown voltage amount or offset. This makes it difficult to determine the logic threshold using the conventional LTAC which simply compares the positive output voltage (Vop) and the negative output voltage (Von) in an attempt to acquire the logic threshold. Due to the requirement for a large input signal range (1V), and due to voltage drops across the diode 6, inside the amplifier 12 and inside the unity gain buffer 10, such a peak detector could not be designed at Vcc=3.0V, while providing reasonable precision and offset performance.

Accordingly, it is desirable to provide high precision techniques for comparing a positive output voltage to a negative output voltage in the context of low power optical receiver modules. For example, it would be desirable to provide techniques which can eliminate the need to determine how much a positive output voltage signal is offset from a negative output voltage signals so that a logic threshold does not need to be explicitly determined. Furthermore, other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

The present invention will hereinafter be described in conjunction with the following drawing figures, wherein like numerals denote like elements.

DETAILED DESCRIPTION

Figure 1:
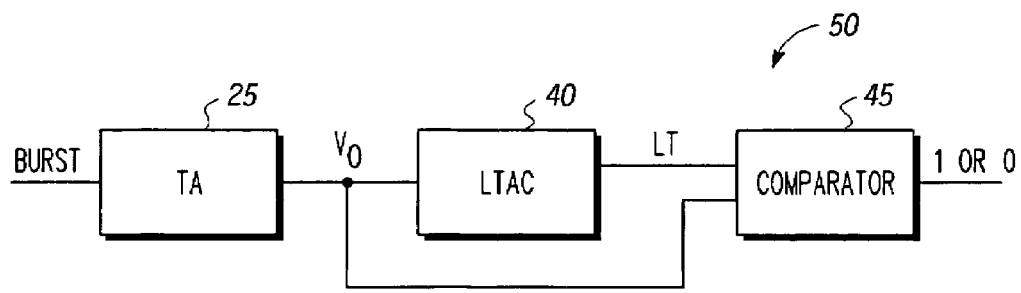
FIG. 1 is a block diagram of a conventional optical receiver module.
Figure 2:
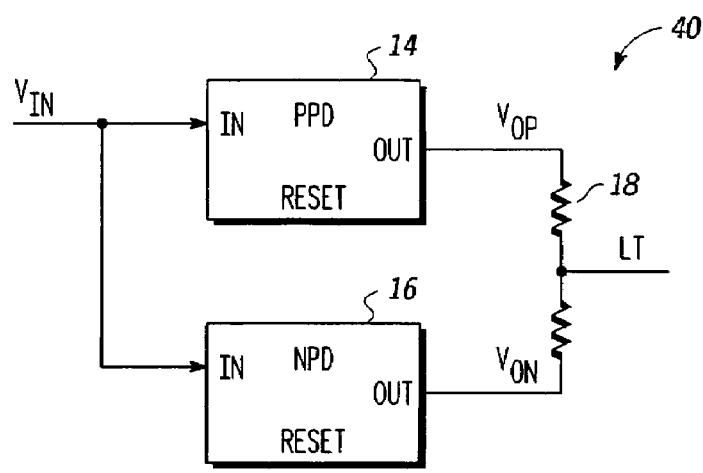
FIG. 2 is a circuit diagram of a conventional logic threshold acquisition circuit (LTAC) used in the optical receiver module of FIG. 1.
Figure 3:
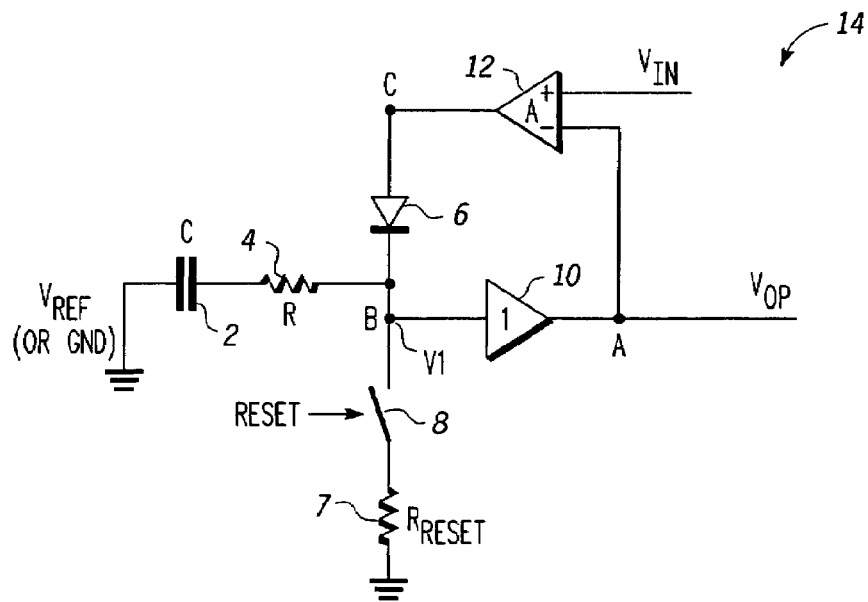
FIG. 3 is a circuit diagram of a conventional top peak detector used in the LTAC of FIG. 2.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The following description refers to nodes or features being "connected" or "coupled" together. As used herein, unless expressly stated otherwise, "connected" means that one node/feature is directly or indirectly connected to another node/feature, and not necessarily mechanically. Likewise, unless expressly stated otherwise, coupled means that one node/feature is directly or indirectly coupled to another node/feature, and not necessarily mechanically. Thus, although the schematics shown in FIGS. 1-5 and 8 depict exemplary arrangements of elements, additional intervening elements, devices, features, or components may be present in an actual embodiment (assuming that the functionality of the circuit is not adversely affected). Furthermore, the connecting lines shown in the various figures contained herein are intended to represent example functional relationships and/or physical couplings between the various elements. It should be noted that many alternative or additional functional relationships or physical connections may be present in a practical embodiment.

The embodiments described below can enable high-precision threshold acquisition, while solving a power supply headroom problem (Vcc=3.0V). A threshold acquisition circuit is provided which implements a positive, reversed peak detector and negative, reversed peak detector to implicitly acquire a logic threshold of a differential signal. A "reversed" peak detector is a peak detector where an input voltage (Vin) and a reference voltage (Vref) are swapped with respect to a conventional peak detector shown in FIG. 3. These reversed peak detectors can be referred to as "pedestal positioning circuits" (PPCs). The reversed peak detector comprises a reset switch, an amplifier, a diode, a capacitor, and a buffer. When a reset in the reversed peak detector is removed a reset switch opens. The output voltage (Vout) is then forced to be equal to the reference voltage (Vref) or higher by an amplifier and a diode. This charges a capacitor to a value which makes the output voltage (Vout) equal to the reference voltage (Vref) when the input voltage (Vin) is at its minimum value. Once the acquisition is complete, the reversed peak detector is "frozen" by shifting the reference voltage (Vref) to a slightly lower value. Thus, the output voltage (Vout) is a replica of the input voltage (Vin) positioned on a "pedestal" equal to the reference voltage (Vref). Since the input voltage (Vin) is AC coupled with the remainder of the circuit by the capacitor, the circuit parameters and the reference voltage (Vref) can be chosen almost independently of the input voltage (Vin). This can allow for high precision acquisition at power supplies of Vcc=3.0V as it provides more power supply headroom.

Each reversed peak detector is single-ended and operates on one half of a differential input signal (Vp, Vn). The reversed peak detectors are identical, and the two output voltages (Vop, Von) generated by the reversed peak detector and used for threshold acquisition are acquired in identical manner. Thus, systematic offset can be eliminated. During the acquisition both halves of the differential input signal (Vp, Vn) are positioned on the same pedestal equal to the reference voltage (Vref) and appear at the outputs of the reversed peak detectors as the output voltages Vop and Von. Data slicing can be accomplished by feeding the output voltages (Vop, Von) directly to the inputs of a comparator. Hence, the explicit logic threshold value does not need to be acquired.

Figure 4:
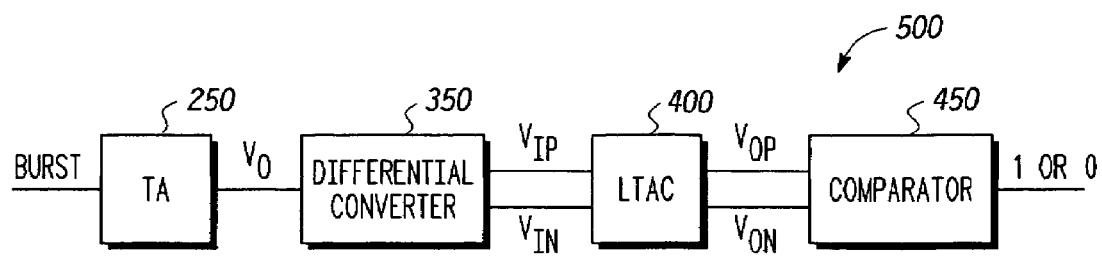
FIG. 4 is a block diagram of an optical receiver module according to an exemplary embodiment.

FIG. 4 is a block diagram of an optical receiver module 500 according to an exemplary embodiment. The optical receiver module 500 comprises a transimpedance amplifier 250 coupled to a differential converter 350 which is coupled to a logic threshold acquisition circuit (LTAC) 400 which is coupled to a comparator 450.

The transimpedance amplifier 250 receives an incoming burst of light and generates an output voltage (Vo) based on that light.

The differential converter 350 is configured to receive a single ended output signal (Vo) of the transimpedance amplifier 350 and generate a first input voltage (Vip) and a second input voltage (Vin) which are sent to the LTAC 400. The differential signal Vip is identical to the single ended output signal (Vo) and the differential signal (Vin) is an inverted version of the single ended output signal (Vo).

The LTAC 400 uses the first input voltage (Vip) and the second input voltage (Vin) to generate a first output voltage (Vop) and a second output voltage (Von).

The comparator 45 compares the first output voltage (Vop) and the second output voltage (Vop) to determine whether the single ended output signal (Vo) comprises a logic 1 or a logic 0. In one embodiment, the single ended output signal (Vo) comprises a logic 1 if the comparator 45 determines that the first output voltage (Vop) is greater than the second output voltage (Von) and comprises a logic 0 if the comparator 45 determines that the first output voltage (Vop) is less than the second output voltage (Von).

Figure 5:
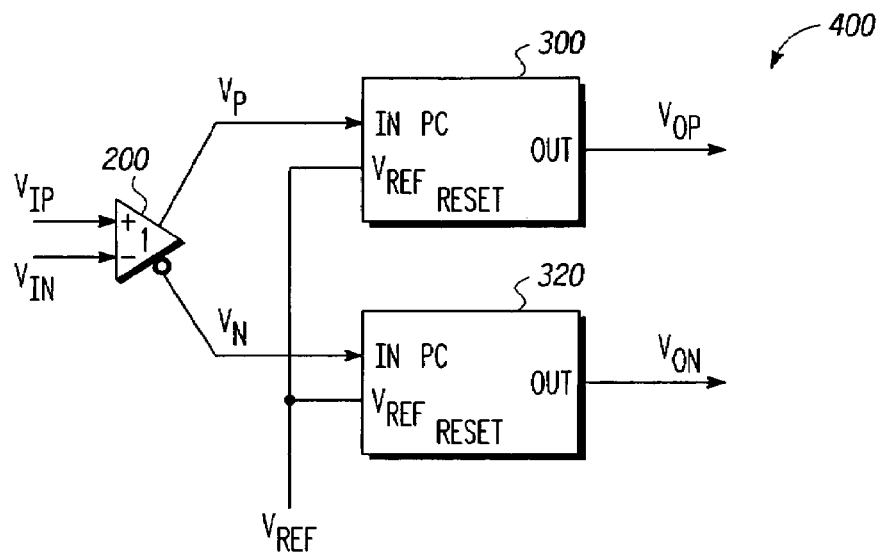
FIG. 5 is a circuit diagram of a LTAC according to an exemplary embodiment.

FIG. 5 is a circuit diagram of a logic threshold acquisition circuit (LTAC) 400 according to an exemplary embodiment. The LTAC 400 comprises an amplifier 200 coupled to a first positioning circuit 300 and a second positioning circuit 320.

An amplifier 200 receives the differential signals (Vip, Vin) and generates the differential signals (Vp) and (Vn) from the differential signals (Vip, Vin). The differential signal (Vn) comprises the inverse of the differential signal (Vp) and has an opposite phase from (Vp). Any noise on one differential signal (Vp) is affected the same way on another differential input signal (Vn), and therefore the noise cancels out. The differential signals (Vp) and (Vn) help provide more dynamic range than a single ended input signal in terms of voltage headroom since the range is determined by looking at the difference between differential signals (Vp) and (Vn).

Figure 6:
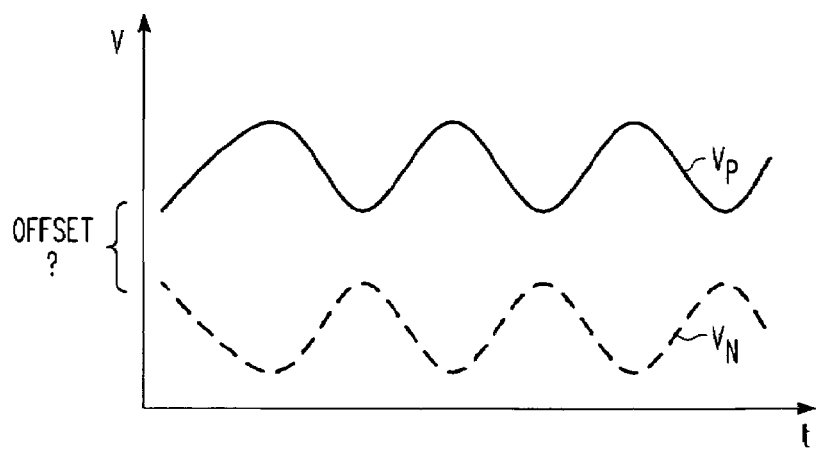
FIG. 6 is a waveform diagram showing differential signals Vp and Vn.

FIG. 6 is a waveform diagram showing the differential signals Vp and Vn. The amplifier 200, responsive to the first input voltage (Vip) and the second input voltage (Vin), generates a first differential input signal (Vp) and a second differential input signal (Vn).

As shown in FIG. 6, the differential signals (Vp) and (Vn) are typically separated or offset from one another by an unknown voltage amount or offset. This makes it difficult to determine the logic threshold using the conventional LTAC 40 which simply compares (Vp) and (Vn) in an attempt to acquire the logic threshold. The LTAC 400 can eliminate the need to determine how much the differential signals (Vp) and (Vn) are offset from one another so that the LT can be accurately determined.

Figure 7:
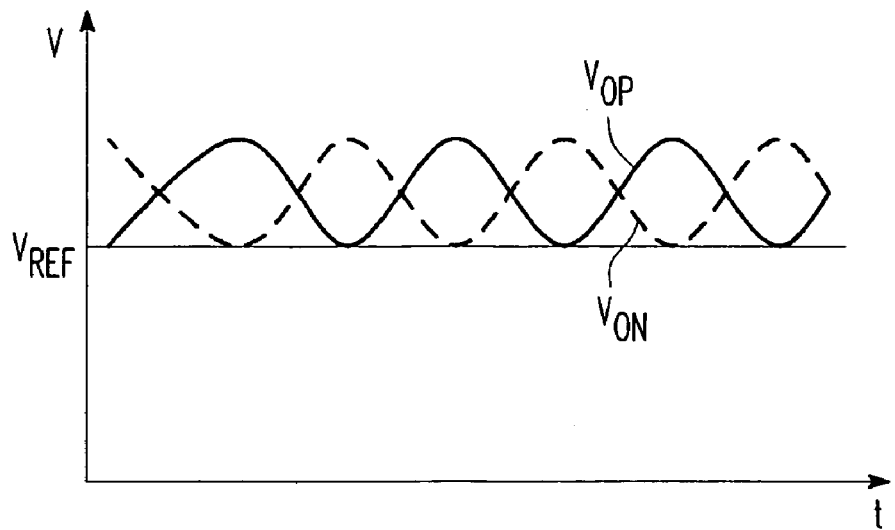
FIG. 7 is a waveform diagram showing the differential output signals Vop and Von positioned on a reference voltage (Vref) pedestal.

FIG. 7 is a waveform diagram showing the differential signals (Vop) and (Von) generated by the first positioning circuit 300 and a second positioning circuit 320, respectively.

The positive output voltage (Vop) and the negative output voltage (Von) share a common reference (above x-axis) such that the positive output voltage (Vop) and the negative output voltage (Von) are not offset from each other. The positive output voltage (Vop) and the negative output voltage (Von) are both greater than the reference voltage (Vref).

The positive output voltage (Vop) is placed above the reference voltage (Vref) such that the positive output voltage (Vop) does not decrease below the reference voltage (Vref). The positive output voltage (Vop) is a replica of (Vp) shifted above the reference voltage (Vref) such that the positive output voltage (Vop) is approximately equal to the reference voltage (Vref) when (Vp) has a minimum value.

The negative output voltage (Von) is placed above the reference voltage (Vref) such that the negative output voltage (Von) does not decrease below the reference voltage (Vref). The negative output voltage (Von) is a replica of (Vn) shifted above the reference voltage (Vref) such that the negative output voltage (Von) is approximately equal to the reference voltage (Vref) when (Vn) has a minimum value.

In one embodiment, the positive differential output signal (Vop) and the negative differential output signal (Von) can be put into a comparator which compares the positive differential output signal (Vop) to the negative differential output signal (Von). The output of the comparator determines whether or not it is receiving a logic 0 or a logic 1. If the positive differential output signal (Vop) is larger than the negative differential output signal (Von), the receiver assumes that a logic 1 is received. If the positive differential output signal (Vop) is smaller than the negative differential output signal (Von), the receiver assumes that a logic 0 has been received.

Thus, the LTAC 400 does not explicitly determine the offset or the logic threshold (the average value between of the maximum peak value and the minimum peak value of the incoming signal) as in the case of the conventional LTAC 40. Rather, as shown in FIG. 7, the offset between the differential signals (Vp, Vn) can be determined implicitly by placing the two halves of the differential output signals (Vop, Von) on the same (Vref) pedestal below which the positive differential output signal (Vop) and the negative differential output signal (Von) can not decrease, and then directly comparing the two halves of the positive differential output signal (Vop) and the negative differential output signal (Von).

Referring again to FIG. 5, the first positioning circuit 300 and the second positioning circuit 320 can be used to implicitly acquire a logic threshold of the first differential input voltage (Vp) and the second differential input voltage (Vn) by positioning the first differential input voltage (Vp) and the second differential input voltage (Vn) along a common axis above the reference voltage (Vref). The first positioning circuit 300 generates a first output voltage (Vop) responsive to the first differential input signal (Vp) and a reference voltage Vref, while the second positioning circuit 320 generates a second output voltage (Von) responsive to the second differential input signal (Vn) and the reference voltage (Vref). A minimum value of the first output voltage (Vop) and a minimum value of the second output voltage (Von) are positioned along a common axis above the reference voltage (Vref). The first positioning circuit 300 and the second positioning circuit 320 can be implemented using a pair of reverse peak detectors.

Figure 8:
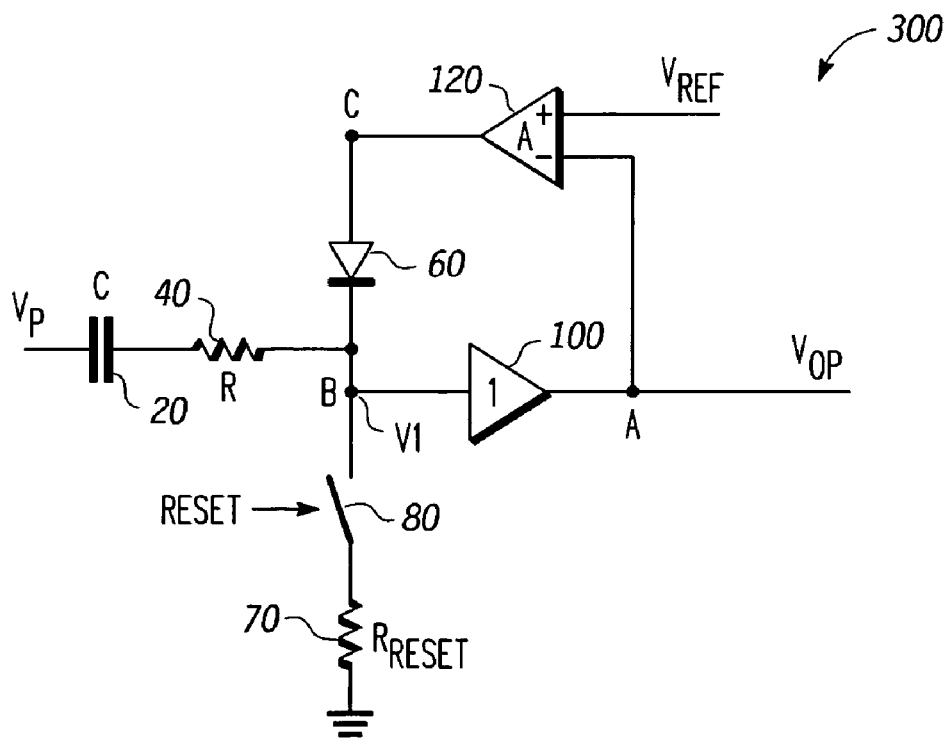
FIG. 8 is a circuit diagram of a positive reversed peak detector according to an exemplary embodiment.

FIG. 8 is a circuit diagram of a positive reversed peak detector 300 according to an exemplary embodiment. The positive reversed peak detector 300 comprises a capacitor 20, a resistor 40, a diode 60, a resistor 70, a switch 80, a buffer 100, and an amplifier 120. It should be appreciated that a negative reversed peak detector 320 can be implemented by simply flipping the diode 60 so that its anode and cathode are reversed.

The resistor 40 is coupled between the capacitor 20 and node B. The diode 60 can be coupled between node B and node C. The reset switch 80 can be coupled between node B and the resistor 70 to ground. The amplifier 120 can be coupled between node A and the diode 60 at node C. The buffer 100 can be coupled between node B and node A.

The reset switch 80 opens before the positive differential input signal (Vp) burst arrives to make the voltage (V1) at node B approximately zero.

The capacitor 20 receives a first differential input (Vp). Because the buffer 100 has a very high input impedance and the diode 60 is off, the voltage across the capacitor 20 can not change. This is because the charge of the capacitor 20 can not immediately change without a current flow, and a current can not flow when the diode 60 is off. In response to the positive differential input signal (Vp), the voltage (V1) at node B follows the positive differential input signal (Vp). As such, the positive differential input signal (Vp) is transferred fully to node B such that the voltage (V1) at node B eventually equals the positive differential input signal (Vp). Regardless of what happens to the first differential input signal (Vp), the diode 60 starts conducting each time the positive output voltage (Vop) decreases below the reference voltage (Vref). When the positive differential input voltage (Vp) is equal to a minimum value, the diode 60 turns on and drives the capacitor 20 so that a voltage (V1) at node B is maintained or held at the reference voltage (Vref).

The amplifier 120 receives the reference voltage (Vref) and the positive output voltage (Vop) generated by the buffer 100, and generates a signal which drives the diode 60.

If the first differential input signal (Vp) starts decreasing, and the voltage (V1) at node B, which equals the positive output voltage (Vop), becomes less than the reference voltage (Vref). As such, the output of the amplifier 120 starts increasing because the positive output voltage (Vop) starts decreasing as the diode 60 turns on. When the diode 60 turns on the diode 60 drives the capacitor 20 forcing the voltage (V1) at node B to the reference voltage (Vref). The positive differential input signal (Vp) affects the circuit only if the positive differential input voltage (Vp) goes below its previous minimum value. Thus, the positive reversed peak detector circuit 300 effectively prevents the voltage (V1) at node B, and hence the positive output voltage (Vop) which is equal to the voltage (V1) at node B, from going below the reference voltage (Vref).

The buffer 100 generates a positive output voltage (Vop) such that a minimum value of the positive output voltage (Vop) is placed above the reference voltage (Vref). The positive output voltage (Vop) is placed above the reference voltage (Vref) because the capacitor 20 is charged to such a value that the positive output voltage (Vop) can not go below the reference voltage (Vref). In essence, the positive output voltage (Vop) is placed on a reference voltage (Vref) pedestal below which the positive output voltage (Vop) can not decrease.

The reverse peak detector circuit 320 is structurally identical to the positive peak detector circuit 300 except that the capacitor 20 receives a second differential input (Vn), the amplifier 12 receives the negative output voltage (Von) from the buffer 100, and the buffer 100 is configured to generate the negative output voltage (Von) such that a minimum value of the negative output voltage (Von) is placed above the reference voltage (Vref).

According to one implementation a reversed peak detector circuit is provided which can include, for example, a reference signal input having a reference value, a capacitor coupled to a resistor at a node, the capacitor being configured to receive a differential input signal, a diode coupled to the node, a switch coupled between the node and ground, a buffer, coupled between the node and a second node and an amplifier, coupled between the second node and the diode. The buffer is configured to generate an output signal. The amplifier is configured to receive the reference signal and the output signal, wherein a minimum value of the output signal is greater than or equal to the reference value. The output signal is a replica of the differential input signal shifted to a value greater than the value of the reference signal.

According to one implementation a circuit is provided which is configured to generate a first output signal and a second output signal. The circuit may include, for example, a reference signal input having a reference value, a first positioning circuit configured to generate the first output signal responsive to a first differential input signal and the reference signal, and a second positioning circuit configured to generate the second output signal responsive to a second differential input signal and the reference signal. A minimum value of the first output signal and a minimum value of the second output signal are greater than or equal to the reference value.

The circuit may also include a differential converter configured to receive an input signal and configured to generate a first input signal and a second input signal, an amplifier configured to receive the first input signal and the second input signal and configured to generate a first differential input signal and a second differential input signal, and a comparator configured to compare the first output signal and the second output signal to determine whether the input signal comprises a logic 1. According to one implementation, the input signal comprises a logic 1 if the comparator determines that the first output signal is greater than the second output signal, and wherein the input signal comprises a logic 0 if the comparator determines that the first output signal is less than the second output signal.

According to one implementation, the first positioning circuit comprises a first reversed peak detector which can include, for example, a first capacitor coupled to a first resistor at a first node, wherein the first capacitor receives the first differential input signal, a first diode coupled to the first node, a first switch coupled between the first node and ground, a first amplifier, coupled between a second node and the first diode, wherein the first amplifier is configured to receive the reference signal and the first output signal, and a first buffer, coupled between the first node and the second node, wherein the first buffer is configured to generate the first output signal. A minimum value of the first output signal is placed above the reference value.

According to one implementation, the first diode drives the capacitor so that a voltage at the first node is maintained at the reference value when the first differential input signal is equal to a minimum value.

According to one implementation, the minimum value of the first output signal greater than the reference value such that the minimum value of the first output signal does not decrease to the reference value. According to one implementation, the minimum value of the first output signal is approximately equal to the reference value when the first differential input signal has a minimum value.

According to one implementation, the first output signal is a replica of the first differential input signal shifted to a value greater than the reference value.

According to one implementation, the second positioning circuit comprises a second reversed peak detector which can include, for example, a second capacitor coupled to a second resistor at a third node, wherein the second capacitor receives the second differential input signal, a second diode coupled to the third node, a second switch coupled between the third node and ground, a second amplifier, coupled between the fourth node and the second diode, wherein the second amplifier is configured to receive the reference signal and the second output signal, and a second buffer, coupled between the third node and the fourth node, wherein the second buffer is configured to generate the second output signal. A minimum value of the second output signal is placed above the reference value.

According to one implementation, the second diode drives the capacitor so that a voltage at the third node is maintained at the reference value when the second differential input signal is equal to a minimum value. According to one implementation, the minimum value of the second output signal is greater than the reference value such that the minimum value of the second output signal does not decrease below the reference value.

According to one implementation, the minimum value of the second output signal is approximately equal to the reference value when the second differential input signal has a minimum value.

According to one implementation, the second output signal is a replica of second differential input signal shifted to a value greater than the reference value.

According to one implementation, the first output signal and the second output signal share a common reference (above x-axis) such that the first output signal and the second output signal are not offset from each other.

According to one implementation, the first positioning circuit and the second positioning circuit are used to implicitly acquire a logic threshold of the first differential input signal and the second differential input signal by positioning the first differential input signal and the second differential input signal along a common axis at values greater than or equal to the reference value.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A circuit, comprising:
    a reference signal input having a reference value;
    a first reversed peak detector configured to generate a first output signal responsive to a first differential input signal and the reference signal, wherein the first reversed peak detector comprises:
        a first capacitor coupled to a first resistor at a first node, wherein the first capacitor receives the first differential input signal;
        a first diode coupled to the first node, wherein the first diode drives the first capacitor so that a voltage at the first node is maintained at the reference value when the first differential input signal is equal to a minimum value;
        a first switch coupled between the first node and ground;
        a first amplifier, coupled between a second node and the first diode, wherein the first amplifier is configured to receive the reference signal and the first output signal; and
        a first buffer, coupled between the first node and the second node, wherein the first buffer is configured to generate the first output signal, wherein the first output signal is a replica of the first differential input signal shifted to a value greater than the reference value; and
    a second reversed peak detector configured to generate a second output signal responsive to a second differential input signal and the reference signal, wherein the second output signal is a replica of the second differential input signal shifted to a value greater than the reference value, and
    wherein a minimum value of the first output signal is placed above the reference value and a minimum value of the second output signal are greater than or equal to the reference value.

2. The circuit of claim 1, wherein the minimum value of the first output signal greater than the reference value such that the minimum value of the first output signal does not decrease to the reference value.

3. The circuit of claim 1, wherein the minimum value of the first output signal is approximately equal to the reference value when the first differential input signal has a minimum value.

4. The circuit of claim 1, wherein the minimum value of the second output signal is greater than the reference value such that the minimum value of the second output signal does not decrease below the reference value.

5. The circuit of claim 1, wherein the minimum value of the second output signal is approximately equal to the reference value when the second differential input signal has a minimum value.

6. The circuit of claim 1, wherein the first output signal and the second output signal share a common reference such that the first output signal and the second output signal are not offset from each other.

7. The circuit of claim 1, further comprising:
    a differential converter configured to receive an input signal and configured to generate a first input signal and a second input signal; and
    an amplifier configured to receive the first input signal and the second input signal and configured to generate a first differential input signal and a second differential input signal.

8. The circuit of claim 7, further comprising:
a comparator configured to compare the first output signal and the second output signal to determine whether the input signal comprises a logic 1.

9. The circuit of claim 8, wherein the input signal comprises a logic 1 if the comparator determines that the first output signal is greater than the second output signal, and wherein the input signal comprises a logic 0 if the comparator determines that the first output signal is less than the second output signal.

10. A circuit, comprising:
a reference signal input having a reference value; and
a reversed peak detector, comprising:
 a first node configured to receive a differential input signal;
 a buffer, coupled between the first node and a second node, wherein the buffer is configured to generate a first output signal;
 an amplifier, coupled to the second node, wherein the amplifier is configured to receive the reference signal and the first output signal and to generate a second output signal; and
 a diode, coupled to the first node and the amplifier, the diode being configured to receive the second output signal; and
 a first resistor coupled to the first node; and
 a capacitor coupled to the first resistor at the first node, wherein the first capacitor receives the differential input signal, wherein the diode drives the first capacitor so that a voltage at the first node is maintained at the reference value when the differential input signal is equal to a minimum value, wherein a minimum value of the first output signal is approximately equal to the reference value when the differential input signal has the minimum value.

11. The circuit of claim 10, wherein the first output signal is a replica of the differential input signal shifted to a value greater than the reference value such that the minimum value of the first output signal is greater than or equal to the reference value.

12. The circuit of claim 11, wherein the reversed peak detector further comprises:
a switch coupled between the first node and ground.

13. The circuit of claim 10, further comprising:
a differential converter configured to receive an input signal and configured to generate a first input signal and a second input signal; and
an amplifier configured to receive the first input signal and the second input signal and configured to generate the differential input signal.

* * * * *